Aug. 17, 1943.　　C. H. WESTCOTT　　2,327,231
SPLIT DOWEL BAR WITH BEARING AND SUPPORT
Original Filed May 20, 1935
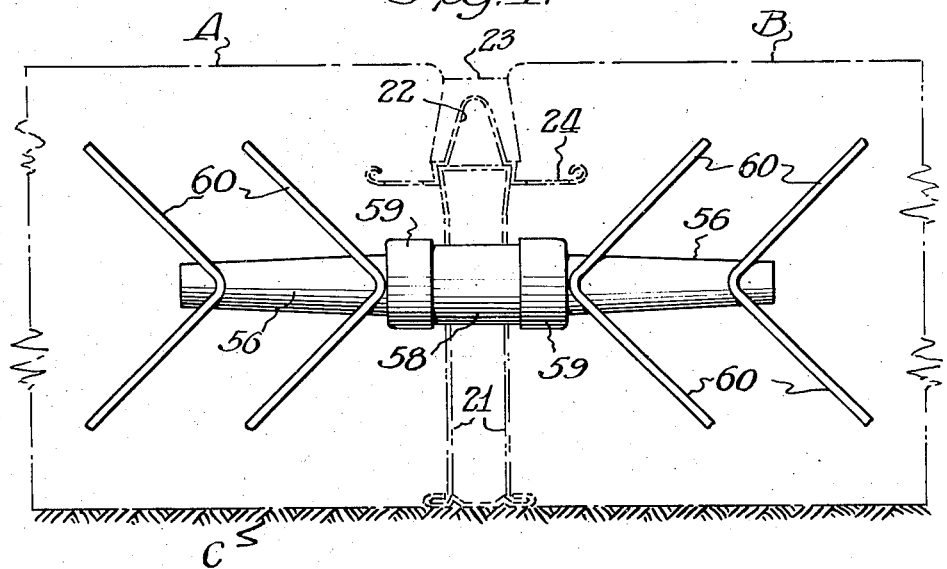
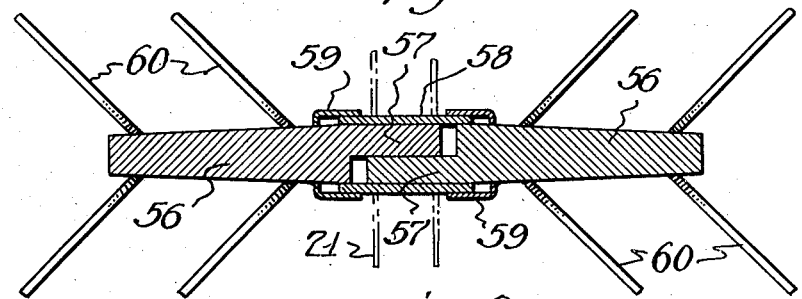
Fig. 4.
Fig. 5.
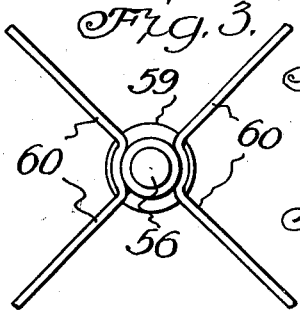
Fig. 6.
Fig. 7.
Inventor
Clifford H. Westcott
by Banning & Banning
His Attorneys Patented Aug. 17, 1943

2,327,231

UNITED STATES PATENT OFFICE 2,327,231

SPLIT DOWEL BAR WITH BEARING AND SUPPORT

Clifford H. Westcott, Oak Park, Ill., assignor to James H. Jacobson, Chicago, Ill.

Original application May 20, 1935, Serial No. 22,308. Divided and this application April 6, 1942, Serial No. 437,770

6 Claims. (Cl. 94—18)

My present invention relates to the construction of bridges, masonry and other concrete structures, and particularly to the building of highways and concrete pavements, and more particularly to a dowel bar and its bearing, the dowel bridging the space between and structurally connecting the adjoining end faces of adjacent concrete slabs, transferring road loads from one concrete slab to the next adjoining slab.

This is a division of my co-pending application Serial No. 22,308, filed May 20, 1935.

The primary objects of my present invention are to maintain the surface of the adjoining slabs uniform and in substantially the same plane so as to obtain a comparatively smooth and uninterrupted surface for the motoring public;

To reduce the high bearing stresses existing at the edge of the slab by providing a greater bearing area in contact with the concrete at the edge of the slab;

To further reduce the high edge stresses by virtue of radiating anchors or fins which either absorb load or transmit and distribute the dowel loads to and within the slab and thereby eliminate high stress areas in the slab that would otherwise exist;

To provide a shorter effective length of structural dowel member whereby the deflection of the dowel is materially reduced;

To decrease the deflection of the short dowel during periods of low transmission by furnishing a definite structural support for the body of the dowel, which not only eliminates channeling within the slab, but by so doing also decreases deflection under periods of load transmission;

To increase the load transmission capacity of the common dowel, as a dowel used for the purpose of load transmission is required to withstand bending and shearing stresses, and I materially reduce these bending stresses in a dowel by effectively reducing the length of the bar;

To increase the load transmission capacity of the dowel by virtue of this reduction in length with the consequent increased capacity in bending. Due to this shorter length and consequent smaller deflection, the load transfer capacity of the dowel is considerably increased, the amount of increase depending upon the thickness of the slab and the modulus of the subgrade reaction;

To provide a split dowel, comprised of overlapping portions encased in a sleeve with end closures and radial arms, adapted to effectively distribute the applied load; and To obtain an air space at the end of the short dowel so that the dowel may move freely to accommodate the movement of the adjoining slabs during periods of volume change.

My present invention has these and other objects, all of which are explained in detail and may be more readily understood when read in conjunction with the accompanying drawing (one sheet), which illustrates the preferred embodiment of my invention, it being manifest that changes and modifications may be resorted to without departure from the spirit of the claims forming a part hereof, and wherein like reference characters refer to like parts throughout.

In the drawing:

Figure 1 is a section through a metallic, air cushion type of expansion joint positioned between the end faces of adjoining slab sections and embodying my invention, the dowel being shown in elevation, the concrete and the joint member are shown in broken lines as comprising no part of my invention;

Fig. 2 is a vertical section through the dowel;

Fig. 3 is an end elevation of the dowel shown at Fig. 1;

Fig. 4 is a cross section through a conventional form of cylindrical or common dowel bar;

Fig. 5 is a like section through a deformed bar;

Fig. 6 is a like section through a dowel of rectangular cross section; and

Fig. 7 is a similar section through a bar of I-beam or H-section.

The structure illustrated involves the application of my invention to a roadway slab cast in situ, and for purpose of description only I choose to define my invention as applied to this particular construction; however, I wish it understood that its adoption and use are equally applicable to any poured or pre-cast structure, whether it be a roadway slab or a retaining wall, dam, or building structure, for as a matter of fact they are applicable to an almost unlimited number of structures.

For purpose of illustration, I have shown a conventional type of expansion joint, comprising a stool with spaced side walls 21—21 closed at the bottom and supporting a metallic seal 22 with a mastic cap 23, the seal being provided with lateral anchors 24. This joint is positioned between and abuts the adjoining end faces of adjacent concrete slabs A and B, which are shown resting upon the subgrade C; and whereas I have shown and described such form of joint, I wish it understood that any type or construction of joint may be employed in association with my invention, whether it be an expansion joint, contraction joint, or a construction joint, as the joint member per se is not a part of my present invention.

My invention consists in spanning the space (or joint) between the slabs A and B with a relatively short split dowel bar 56 positioned at substantially mid-depth of the slabs and parallel with the top surface thereof and normal to the plane of the joint; and whereas I have shown the dowel as the common rolled bar of circular cross section, it will be apparent to those skilled in the art that dowels of various cross sections may be employed as illustrated.

The adjoining ends of the dowel 56 are offset, lapped and telescoped into and incased within a cylindrical bearing sleeve 58, the dowel sections are symmetrically positioned, one on each side of the joint, and adapted to be cast into their respective slabs as shown. The sleeve 58 is reamed or suitably formed to provide a snug and tight sliding fit for the dowel and of a length sufficient to provide an air chamber of a depth equivalent to at least one half of the joint (or space) between the adjoining slabs. The outer ends of the sleeve are respectively sealed with a cap or end closure 59 which is positioned approximately flush with the face of the respective slab sections. A pair of radial legs or arms 60—60 are formed integral with the protruding end portion of each section of the split dowel and diverge therefrom back into the slab, portions of which may or may not rest directly upon the subgrade C, and thus serve not only as load distributing members, but also as a support for the assembly prior to and during the pouring of the concrete.

The dowel, as shown, is made in two separate and complemental members, that is, the adjoining ends of the two-part or split dowels are offset and vertically superimposed one above the other, so that one member overlaps and forms a bearing for the opposite like member, for the purpose of transferring vertically imposed load from one to the other. And being incased in a relatively tight and snug fitting sleeve, this transfer of applied load is accomplished both by direct bearing and by reversal of stress, as is the case when the load passes from one slab—across the joint—and on to the next adjoining slab.

In the assembly of the dowel bar and its bearing and support, the dowel is first passed through the joint with equal lengths protruding on each side thereof, the bearing sleeve 58 is next placed over the adjoining and overlapping ends of the dowel as shown, and then temporarily held in place by suitable means, such as a bolt or wire which may be passed through the joint and around the aligned projections or arms 60—60 which protrude from the dowel. The dowel structure just defined is assembled at intervals throughout the length of the mechanical joint, and at the desired spacing to accommodate the estimated loads the pavement is to carry. The entire structure, including the dowel assembly and the joint, is then placed upon the subgrade, the stool of the joint resting directly upon the subgrade and being suitably staked in place in a conventional manner, and due to this particular assembly, the dowels are maintained in proper alignment, the joint is held in place, and the slabs are then poured, cured, and the highway opened to traffic and the resultant application of moving wheel loads.

In operation, and as the moving wheel load approaches the joint traveling from the initially loaded slab A towards the next adjacent slab B, the load is absorbed by the dowel bar, and particularly through the radial arms 60, and then transmitted to the sleeve 58 and dowel 56 and thence across the joint to a like unit on the opposite side in the next adjacent slab, where the concentrated load is dissipated through the sleeve and the radial arms and distributed into the slab structure. As the load crosses the joint and onto the next adjacent slab, the reverse of the above action starts at a maximum and diminishes as the load passes on. The short split dowel remains at all times at or near the neutral axis of the slabs, whereas the radial arms remain within the tension and compression areas intersecting the shear planes and reinforcing the edge of the slab. This action of the dowel structure absorbs and so distributes the load that if failure does occur it will take place outside of the field embraced by the dowel bar structure, thus effectively transmitting the full strength of one slab to the other without interruption; in fact, the employment of this structure insures the highway against joint failures, as the slab here is stronger at the joint than at any other point. The caps 59 increase the bearing value of the sleeve 58 in the concrete and assist in the distribution of load to such an extent as to retard the channeling of the concrete structure.

The foregoing discussion and illustrations have applied in general to poured concrete—cast in situ; but precast concrete, art marble, imitation stone, glass, terra cotta, and many similar products are gaining favor in the building industry of today. Many times these preferred products would be used in places where they are not now used if it were possible to effectively transmit a load from one to the next adjoining section. My invention is equally applicable to such or similar fields of work.

I claim:

1. A load transfer device for use in association with adjoining concrete slabs comprising a pair of opposed and longitudinally aligned dowel shaped members each having portions thereof adapted to be anchored to its related slab, the opposed portions of each being adapted to span the gap between the adjoining slabs and engage and form a bearing for the other, the engaging portions thereof being vertically superimposed one above the other so that a portion of the vertical load applied to either will be imparted to the other, a plurality of angularly disposed arms integral with each respective dowel member extending radially therefrom and adapted to anchor their respective dowel members to their related slabs, and a relatively rigid sleeve member adapted to encircle and snugly fit the engaging portions of the assembled dowels and thereby assist in the transfer of vertically applied loads from one dowel member to the other.

2. A load transferring device for use in association with adjoining concrete slabs comprising a pair of opposing and longitudinally aligned dowel members each having its rear portion adapted to be anchored to its related slab, each having its forward portion shouldered to lap against and telescope with the correspondingly shouldered portion of the companion dowel member, the lapped portions of the two members being adapted to span the gap between the adjoining slabs and to engage and form bearings each for the other, and rigid means engaging the over-lapped portions of the dowel members and adapted to hold the same in engaging relation and thereby assist in the transfer of vertically applied loads from one dowel member to the other.

3. A load transferring device for use in association with adjoining concrete slabs comprising a pair of opposing and longitudinally aligned dowel members each having its rear portion adapted to be anchored to its related slab, each having its forward portion shouldered to lap against and telescope with the correspondingly shouldered portion of the companion dowel member, the lapped portions of the two members being adapted to span the gap between the adjoining slabs and to engage and form bearings each for the other, the engaging portions being vertically superimposed one above the other so that a portion of the vertical load applied to either will be applied to the other, and rigid means engaging the over-lapped portions of the dowel members and adapted to hold the same in engaging relation and thereby assist in the transfer of vertically applied loads from one dowel member to the other.

4. A load transferring device for use in association with adjoining concrete slabs comprising a pair of opposing and longitudinally aligned dowel members each having its rear portion adapted to be anchored to its related slab, each having its forward portion shouldered to lap against and telescope with the correspondingly shouldered portion of the companion dowel member, the lapped portions of the two members being adapted to span the gap between the adjoining slabs and to engage and form bearings each for the other, and a relatively rigid sleeve member adapted to encircle and snugly fit the engaging portions of the assembled dowels and thereby assist in the transfer of vertically applied loads from one dowel member to the other.

5. A load transferring device for use in association with adjoining concrete slabs comprising a pair of opposing and longitudinally aligned dowel members each having its rear portion adapted to be anchored to its related slab, each having its forward portion shouldered to lap against and telescope with the correspondingly shouldered portion of the companion dowel member, the lapped portions of the two members being adapted to span the gap between the adjoining slabs and to engage and form bearings each for the other, the engaging portions being vertically superimposed one above the other so that a portion of the vertical load applied to either will be applied to the other, and a relatively rigid sleeve member adapted to encircle and snugly fit the engaging portions of the assembled dowels and thereby assist in the transfer of vertically applied loads from one dowel member to the other.

6. A load transfer device for use in association with adjoining concrete slabs comprising a pair of opposed and longitudinally aligned dowel-shaped members, each having its rear portion thereof adapted to be anchored to its related slab; the opposed forward portions of each being adapted to span the gap between the adjoining slabs and each engage and form a bearing for the other, and a relatively rigid sleeve member adapted to span the gap and encircle and snugly fit onto the engaging portions of the assembled dowel members and thereby assist in the transfer of vertically applied loads from one dowel member to the other.

CLIFFORD H. WESTCOTT.